(12) United States Patent
Lee et al.

(10) Patent No.: US 12,528,409 B2
(45) Date of Patent: Jan. 20, 2026

(54) ACTUATOR, REAR VIEW DEVICE AND VEHICLE

(71) Applicant: MOTHERSON INNOVATIONS COMPANY LIMITED, London (GB)

(72) Inventors: Youngmin Lee, Gyeonggi-do (KR); Heesung Woo, Gyeonggi-do (KR); Il-Sung Yu, Gyeonggi-do (KR); Chang Kyun Han, Chungcheongbuk-do (KR); Cheol Ho Yim, Gyeonggi-do (KR)

(73) Assignee: Motherson Innovations Company Limited, London (GB)

( * ) Notice: Subject to any disclaimer, the term of this patent is extended or adjusted under 35 U.S.C. 154(b) by 278 days.

(21) Appl. No.: 18/189,550

(22) Filed: Mar. 24, 2023

(65) Prior Publication Data
US 2023/0331156 A1     Oct. 19, 2023

(30) Foreign Application Priority Data

Apr. 13, 2022   (DE) .................. 10 2022 109 079.5

(51) Int. Cl.
   *B60R 1/072*   (2006.01)
   *B60R 1/07*    (2006.01)
(52) U.S. Cl.
   CPC ..................... *B60R 1/07* (2013.01)
(58) Field of Classification Search
   CPC .. G02B 7/1827; G02B 7/1821; G02B 7/1822; G02B 7/1825; A47G 1/00; B60R 1/072; B60R 1/006; A45D 42/12; B60J 3/0282
   USPC ....... 359/877, 841, 844, 881, 838, 860, 862, 359/865, 879, 871-873
   See application file for complete search history.

(56) References Cited

U.S. PATENT DOCUMENTS

| | | | |
|---|---|---|---|
| 7,070,287 B2 * | 7/2006 | Foote .................. | B60R 1/074 359/841 |
| 7,175,292 B2 * | 2/2007 | Flynn ................... | B60R 1/02 359/876 |
| 7,690,800 B2 * | 4/2010 | Fukai ................... | B60R 1/072 359/876 |
| 10,017,119 B2 * | 7/2018 | Chong ................. | B60R 1/072 |
| 10,076,999 B2 | 9/2018 | Brouwer | |
| 11,628,772 B2 * | 4/2023 | Steffes ................ | B60R 1/074 359/841 |

(Continued)

FOREIGN PATENT DOCUMENTS

JP      2015-202801      11/2015

OTHER PUBLICATIONS

German Patent Office, Appl. 10 2022 109 079.5, Office Action, Oct. 10, 2022.

*Primary Examiner* — Dawayne Pinkney
(74) *Attorney, Agent, or Firm* — Jones Day

(57) ABSTRACT

According to various embodiments of the present disclosure, an actuator designed for pivoting a rear view device and/or at least one rear view element of the rear view device is provided, comprising a lower case; a driving mechanism; an upper cover; and a holder, wherein the holder comprises a supporting part for the at least one rear view element and an extension part extended from the supporting part, wherein a gap is formed between an inner surface of the extension part of the holder and an outer surface of the lower case. Furthermore, a rear view device comprising such actuator as well as a vehicle with such a rear view device is provided.

52 Claims, 10 Drawing Sheets

(56) References Cited

U.S. PATENT DOCUMENTS

| | | | |
|---|---|---|---|
| 2004/0218296 A1* | 11/2004 | Van Stiphout | B60R 1/074 |
| | | | 359/877 |
| 2008/0259474 A1* | 10/2008 | Onuki | B60R 1/074 |
| | | | 359/841 |
| 2011/0194202 A1 | 8/2011 | Kudo et al. | |
| 2013/0208373 A1 | 8/2013 | Kudo et al. | |
| 2017/0282802 A1* | 10/2017 | Sugimura | B60R 1/072 |
| 2017/0349100 A1 | 12/2017 | Miyazaki et al. | |
| 2021/0261052 A1* | 8/2021 | Kawamura | B60R 1/072 |

\* cited by examiner

ACTUATOR, REAR VIEW DEVICE AND VEHICLE

CROSS-REFERENCE TO RELATED APPLICATION

This application claims priority to German Application No. DE 10 2022 109 079.5, filed on Apr. 13, 2022, the entirety of which is incorporated herein by reference.

FIELD

The present disclosure relates to an actuator designed for pivoting a rear view device and/or at least one rear view element of the rear view device, comprising a lower case, a driving mechanism, an upper cover, and a holder. Furthermore, the present disclosure refers to a rear view device comprising such an actuator as well as a vehicle with such a rear view device.

BACKGROUND

A rear view device, such as an external mirror, of the vehicle may provide the driver with a lateral or rear view. In specific driving situation, for example a situation such as parking, a driver needs to have a view not only in the lateral or rear direction of the vehicle but also in the downward direction of the vehicle. In addition, it is necessary to provide various viewing angles depending on the driver's or driving situation.

In order to provide a view in various directions, a rear view element attached to the rear view device or a rear view element may be pivoted. The rear view device may comprise an actuator that operates to pivot the rear view device and/or the rear view element, such as a mirror element, a display unit or a camera device.

The actuator may comprise a driving mechanism such as a driving motor and a gear structure operated by receiving power from the driving motor, as well as various mechanical arrangement structures that receive the driving mechanism or are connected to the driving mechanism to change an angle of the rear view element and/or the rear view device. However, the durability of the mechanical structure of the actuator is limited due to the repeated pivoting movements that causes damage by friction. Moreover, the friction leads to an uncomfortable sound.

U.S. Pat. No. 10,076,999 B2 discloses a movement mechanism comprising a substantially spherical holder and a substantially bowl-shaped ring, which, when inserted into each other, are rotatable relative to each other about a first axis, which lies in a plane which is substantially parallel with the top face of the holder, and a second axis, which second axis lies in a plane equal or parallel to the top face of the ring, and which second axis lies at an angle of approximately 90° to the first axis, while driving means are provided for enabling movement of the holder relative to the ring, which driving means comprise a first non-straight driving rod bearing-mounted in the holder, as well as means for activating the first non-straight driving rod, and a second non-straight driving rod bearing-mounted in the holder, as well as means for activating the second non-straight driving rod. Furthermore, the first non-straight driving rod and the second non-straight driving rod are rotatable about a third and a fourth axis, respectively, which third and fourth axes are mutually parallel and lie in a plane equal or parallel to the top face of the holder and wherein the third and fourth axes coincide with the first axis.

U.S. Pat. No. 6,929,374 B2 discloses a movement mechanism, comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a non-straight driving rod bearing-mounted in the holder, as well as means for activating the driving rod, characterized in that the driving rod has the shape of a ring segment and is connected with a driving part, which is rotatably mounted in a recess in the ring relative to a second axis, which second axis lies in a plane equal or parallel to the top face of the ring, and which second axis lies at an angle of approximately 90 [deg.] to the first axis, wherein the ring segment is rotatable about a third axis which lies in a plane equal or parallel to the top face of the holder and which lies at an angle of approximately 45 [deg.] to the first axis.

In view of the aforementioned drawbacks and other inherent in the existing state of the art, it is an object of the present disclosure to further develop the known actuator to overcome at least some of these drawbacks. In particular it is an object to provide a mechanical arrangement structure of the actuator in which damage may be reduced even in repeated pivoting operations.

SUMMARY

In embodiments of the present disclosure, an actuator is designed for pivoting a rear view device for a vehicle and/or at least one rear view element of the rear view device, comprising a lower case; a driving mechanism; an upper cover; and a holder, wherein the holder comprises a supporting part for the at least one rear view element (or for any other component comprised by the rear view device or the actuator) and an extension part extended from the supporting part, wherein a gap is formed between an inner surface of the extension part of the holder and an outer surface of the lower case.

In an embodiment, the lower case may have an accommodation space formed inside and has a bowl shape; the driving mechanism may be arranged in the accommodation space and/or may comprise at least some of a driving motor, a first drive gear, a first transmission gear and/or a first clutch gear; the driving mechanism may be configured to rotationally move along a part of the lower case, preferably by receiving power from the driving motor; the upper cover may be arranged on the lower case and/or may shield at least a part of the accommodation space; the holder may be moved according to the driving of the actuator; the holder may be adapted to surround the outer surface of the lower case, preferably while being in contact with at least a part of the outer surface of the lower case; the holder may be connected to the first drive gear, preferably such that at least a part thereof operates along the outer surface of the lower case; the holder may be made of an elastic material; and/or the holder may comprise a contact part.

In yet another embodiment the actuator may comprise a connection element, preferably arranged between the upper cover and the holder; the supporting part may have a ring shape; the first transmission gear may be connected with the first output gear and/or the first clutch gear, wherein preferably the first transmission gear may comprise a first transmission part for connecting with the first output gear, and/or a second transmission part for connecting with the first clutch gear, and/or the first clutch gear may comprise a first part for receiving power from the first transmission gear, and/or a second part for engaging with at least a portion of the first drive gear; the contact part may be formed to be protruding at an edge of the extension part, and/or may be configured to be in contact with the outer surface of the lower case; and/or the extension part may comprise a first inner surface and/or a second inner surface facing toward the lower case.

It is also proposed by embodiments of the present disclosure, that the first transmission part and the second transmission part may transmit power in different directions or may transmit power in the same direction, wherein preferably the first transmission part may be provided as a spur gear or a helical gear, and/or the second transmission part may be provided as a worm gear; the first part may be provided in form of a spur gear or a helical gear, preferably to engage the second part; the second part may be provided as a pinion gear, preferably to engage the first drive gear; a first shortest distance between the first inner surface and the outer surface of the lower case may differ from a second shortest distance between the second inner surface and the outer surface of the lower case; and/or a diameter of a circle formed by the contact part may be smaller than a minimum diameter of a circle formed by the outer surface of the lower case.

Furthermore, it is proposed with embodiments of the present disclosure that the first drive gear may comprise a first driving region, preferably to be engaged with the second part, wherein preferably the first driving region is provided as a rack gear; the extension part may further comprise a third inner surface, wherein preferably a shortest distance between the third inner surface and the outer surface of the lower case may be different from at least one of the first shortest distance and the second shortest distance; and/or during movement of the holder the presence of the gap may be maintained, wherein preferably the distance between the holder and the lower case at a specific point of the lower case may be changed.

Furthermore, in embodiments, the outer surface of the lower case may have a predetermined curvature, preferably being constant and/or equal to the curvature of the extension part; and/or the inner surface of the extension part may comprise at least two inflection points between the first inner surface, the second inner surface, and the third inner surface, wherein preferably the inclination of the inner surface may be changed based on the plurality of inflection points.

In a further embodiment, the driving motor may comprise a first terminal and a first output gear, wherein preferably the first terminal may be electrically connected to the outside of the first driving motor to receive power for operating the driving motor, the first terminal may be connected to another terminal or a circuit board arranged in the lower case, the first terminal may be connected to another terminal outside the lower case, and/or the first output gear may transmit the power of the first driving motor to other components of the rear view device and/or vehicle; the contact part may be adapted to slide in a state of being in contact with the outer surface of the lower case, preferably according to an operation of the driving mechanism; and/or a central portion of the connection member may be rotatably connected to a central region of the upper cover, wherein preferably both edges of the connection member are connected to the holder.

It is further proposed, that in embodiments at least one region of the contact part to be in contact with the lower case may have a round shape; the driving mechanism may further comprise a second driving motor and/or a second drive gear; and/or the holder may be connected to each of the first drive gear and the second drive gear and may be preferably pivoted with respect to a horizontal plane in correspondence to the operation of the first drive gear and the second drive gear.

In a further embodiment, the second driving motor may be arranged in the accommodation space; and/or the second drive gear may be operated by receiving power from the second driving motor, wherein preferably the second drive gear may be arranged in a direction perpendicular to the first drive gear.

In yet another embodiment, the first drive gear and the second drive gear may be adapted to form a designated angle with respect to a horizontal surface of an upper region of the holder, wherein the designated angle may preferably be approximately a right angle; and/or the second drive gear may be pivotable in all directions preferably with respect to a plane formed by an upper surface of the lower case.

It is also proposed by embodiments of the present disclosure, that the shape of the outer surface of the first drive gear and the shape of the inner surface of the lower case may correspond to each other; the first drive gear may have a smoothly curved shape, preferably arc-shaped; the inner surface may be formed in a smooth curve; at least one surface-section or the entire inner surface of the extension part may have a non-uniform shape such that preferably the shortest distance from a fixed point of the outer surface of the lower case to the at least one surface-section or the entire inner surface of the extension part may change, preferably according to an operation of the first drive gear; and/or the outer surface may have a non-uniform shape.

Embodiments of the present disclosure, moreover, provide a rear view device for a vehicle, comprising at least one actuator outlined above.

In another embodiment according to the present disclosure, the rear view device may be provided in form of an external mirror, preferably comprising a housing, which preferably may accommodate the at least one actuator, and the at least one rear view element, which preferably may comprise at least one mirror, display unit and/or camera device.

It is further proposed, that in embodiments the at least one rear view element may be configured to connect with the holder to pivot.

According to an embodiment of the present disclosure, the actuator comprises a holder that comprises an extension part extended from the supporting part and adapted to form a gap with the outer surface of the lower case. The gap between the extension part and the lower case may be formed in order to enhance the durability of the holder and to reduce noise that may be generated when the actuator is operated.

According to various embodiments, the actuator may be adapted to pivot the rear view device and/or at least one rear view element, such as a camera and/or a mirror element and/or a display unit.

According to an embodiment of the actuator, the lower case has an accommodation space formed inside and has a bowl shape, the driving mechanism is arranged in the accommodation space, and/or having a driving motor and a drive gear, the upper cover is arranged on the lower case and/or shields at least a part of the accommodation space, the holder is adapted to surround an outer surface of the lower case and/or is connected to a drive gear, preferably such that at least a part thereof operates along an outer surface of the lower case and/or the holder comprises a supporting part, and/or a contact part.

According to various embodiments of the present disclosure, an actuator for a rear view device is provided, the actuator comprising: a lower case having an accommodation space formed inside and having a bowl shape; a driving mechanism arranged in the accommodation space, and having a driving motor and a drive gear configured to rotationally move along a part of the lower case by receiving power from the driving motor; an upper cover arranged on the lower case and shielding at least a part of the accommodation space; and a holder adapted to surround an outer surface of the lower case and connected to the drive gear such that at least a part thereof operates along an outer surface of the lower case; wherein the holder comprises, a supporting part having a ring shape, an extension part extended from the supporting part and adapted to form a gap with the outer surface of the lower case, and a contact part formed to be protruding at an edge of the extension part, and configured to be in contact with the outer surface of the lower case, wherein the extension part comprises a first inner surface and a second inner surface facing toward the lower case, and the shortest distance from the first inner surface to the lower case differs from the shortest distance from the second inner surface to the lower case.

According to various embodiments of the present disclosure, an actuator for a rear view device is provided, the actuator comprises: a lower case having an accommodation space formed inside and having a bowl shape; a driving mechanism arranged in the accommodation space, and having a driving motor and a drive gear configured to rotationally move along a part of the lower case by receiving power from the driving motor; an upper cover arranged on the lower case and shielding at least a part of the accommodation space; and a holder adapted to surround an outer surface of the lower case and connected to the drive gear such that at least a part thereof operates along an outer surface of the lower case; wherein the holder comprises, a supporting part having a ring shape, an extension part extended from the supporting part and adapted to form a gap with the outer surface of the lower case, and a contact part formed to be protruding at an edge of the extension part, and configured to be in contact with the outer surface of the lower case, wherein an inner surface of the extension part has a non-uniform shape such that the shortest distance from a fixed point of the outer surface of the lower case to the inner surface of the extension part changes according to an operation of the drive gear.

According to various embodiments, the actuator comprises a lower case accommodating a driving mechanism and a holder adapted to form a gap with the lower case, and thus damage to repeated pivoting operations may be reduced.

Embodiments of the present disclosure, moreover, provide a rear view device for a vehicle, comprising at least one actuator outlined above.

Furthermore, embodiments of the present disclosure provide an external mirror as an embodiment of a rear view device for a vehicle, comprising at least one actuator outlined above.

According to various embodiments of the present disclosure, an external mirror as an embodiment of a rear view device for a vehicle is provided, the external mirror comprising: a housing; an actuator accommodated in the housing, wherein the actuator comprises, a lower case having an accommodation space formed inside and having a bowl shape, a driving mechanism arranged in the accommodation space, and having a driving motor and a drive gear configured to rotationally move along a part of the lower case by receiving power from the driving motor, an upper cover arranged on the lower case and shielding at least a part of the accommodation space, and a holder adapted to surround an outer surface of the lower case and connected to the drive gear such that at least a part thereof operates along an outer surface of the lower case, a rear view element configured to connect with the holder to pivot; wherein the holder comprises, a supporting part having a ring shape, an extension part extended from the supporting part and adapted to form a gap with the outer surface of the lower case, and a contact part formed to be protruding at an edge of the extension part, and configured to be in contact with the outer surface of the lower case, wherein an inner surface of the extension part has a non-uniform shape such that the shortest distance from a fixed point of the outer surface of the lower case to the inner surface of the extension part changes according to an operation of the drive gear.

According to an embodiment, the external mirror further comprises a housing, preferably accommodating the at least one actuator outlined above and a rear view element. The rear view element may be at least one mirror element and/or display unit (that outputs an image obtained by photographing a peripheral region of the vehicle) and/or camera device.

Furthermore, it is proposed with embodiments of the present disclosure, that the rear view element is configured to connect with the holder to pivot.

According to various embodiments of the present disclosure, there is provided an actuator comprising: a lower case having an accommodation space formed therein and a bowl shape; a driving mechanism arranged in the accommodation space, and having a driving motor and a drive gear receiving power from the driving motor to rotationally move along the lower case; a upper cover arranged on the lower case and shielding at least a part of the accommodation space; and a holder adapted to surround an outer surface of the lower case and connected to the drive gear such that at least a part thereof operates along an outer surface of the lower case; wherein the holder has a supporting part having a ring shape; a extension part extended from the supporting part and adapted to form a gap with the outer surface of the lower case; and a contact part formed to be protruding at an edge of the extension part, and configured to be in contact with the outer surface of the lower case, and wherein the extension part comprises a first inner surface and a second inner surface facing toward the lower case, and the shortest distance from the first inner surface to the lower case differs from the shortest distance from the second inner surface to the lower case.

According to an embodiment, when the actuator is viewed from above, the actuator may be provided in which a diameter of a circle formed by the contact part is smaller than a diameter of a circle formed by an outer surface of the lower case.

According to an embodiment, the extension part may further comprise a third inner surface, and the actuator may be provided in which the shortest distance from the third inner surface to the lower case is different from both the shortest distance from the first inner surface to the lower case and the shortest distance from the second inner surface to the lower case.

According to an embodiment, an actuator formed to have a constant curvature on an outer surface of the lower case may be provided.

According to an embodiment, the contact part may be provided with an actuator configured to slide in a state of being in contact with an outer surface of the lower case according to an operation of the driving mechanism.

According to an embodiment, an actuator may be provided in which at least one region of the contact part for contacting the lower case has a round shape.

According to an embodiment, the driving mechanism may further comprise a second driving motor arranged in the accommodation space and a second drive gear operated by receiving power from the second driving motor and arranged in a direction perpendicular to the drive gear.

According to an embodiment, the holder may be connected to the drive gear and the second drive gear to be pivotable in all directions with respect to a plane formed by the upper surface of the lower case.

According to various embodiments of the present disclosure, there is provided an actuator comprising: a lower case having an accommodation space formed therein and a bowl shape; a driving mechanism arranged in the accommodation space, and having a driving motor and a drive gear receiving power from the driving motor to rotationally move along the lower case; a upper cover arranged on the lower case and shielding at least a part of the accommodation space; and a holder adapted to surround an outer surface of the lower case and connected to the drive gear such that at least a part thereof operates along an outer surface of the lower case; wherein the holder has a supporting part having a ring shape; a extension part extended from the supporting part and adapted to form a gap with the outer surface of the lower case; and a contact part formed to be protruding at an edge of the extension part, and configured to be in contact with the outer surface of the lower case, and wherein an inner surface of the extension part has a non-uniform shape such that the shortest distance from a fixed point of the outer surface of the lower case to the inner surface of the extension part changes according to an operation of the drive gear.

According to various embodiments, there is provided an external mirror as an embodiment of a rear view device for a vehicle comprising: a housing; an actuator comprising a lower case accommodating in the housing, having an accommodation space formed therein and having a bowl shape; a driving mechanism arranged at the accommodation space and comprising a driving motor and a drive gear configured to receive power from the driving motor to rotationally move along the lower case; an upper cover arranged on the lower case and configured to shield at least a part of the accommodation space; and a holder adapted to surround an outer surface of the lower case and connected to the drive gear such that at least a part thereof operates along the outer surface of the lower case; wherein the holder has a supporting part having a ring shape; an extension part extending from the supporting part and adapted to form a gap with the outer surface of the lower case; and a contact part formed to protruding an edge region of the extension part and configured to be contacted with the outer surface of the lower case; and a rear view element connected to the holder, and wherein an inner surface of the extension part has a non-uniform shape such that the shortest distance from a fixed point of the outer surface of the lower case to the inner surface of the extension part changes according to an operation of the drive gear.

In the other embodiment, it is further proposed that a rear view device of a vehicle may comprise a housing; an actuator accommodated in the housing and a rear view element configured to connect with the holder to pivot.

According to various embodiments, the actuator may include a lower case accommodating a driving mechanism and a holder disposed to form a gap with the lower case, and thus damage to repeated pivoting operations may be reduced.

Embodiments of the present disclosure also provide a vehicle with at least one rear view device as outlined above.

Other aspects, advantages, and salient features of the present disclosure will become apparent to those skilled in the art from the following detailed description, which taken in conjunction with the annexed drawings, discloses exemplary embodiments of the disclosure, wherein:

DETAILED DESCRIPTION

Figure 1:
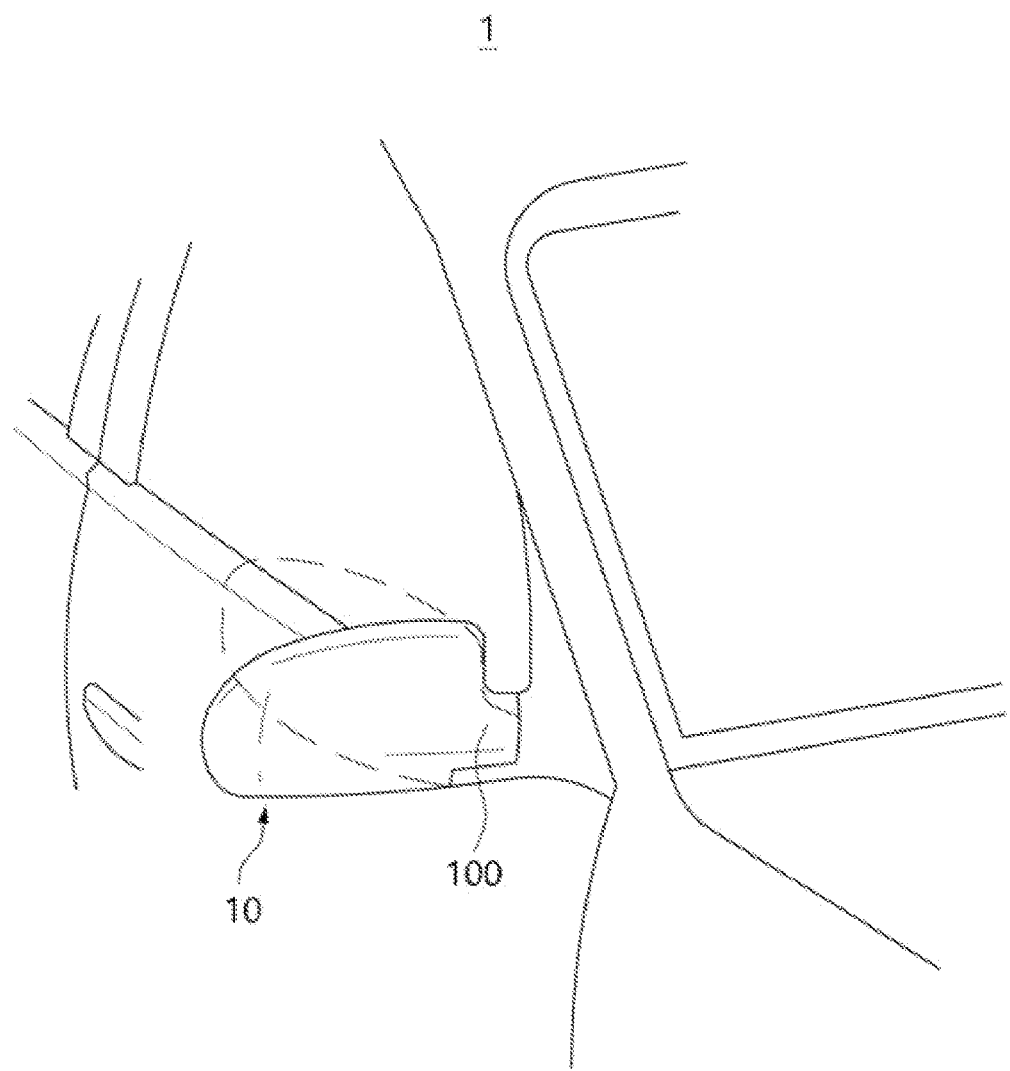
FIG. 1 is an embodiment of a rear view device in form of an external mirror according to the present disclosure in which an actuator according to the present disclosure is mounted according to the present disclosure.

The foregoing objects, features and advantages of the present disclosure will become more apparent from the following detailed description related to accompanying drawings. However, various modifications may be applied to the present disclosure, and the present disclosure may have various embodiments. Hereinafter, specific embodiments, which are illustrated in the drawings, will be described in detail.

In the drawings, the thicknesses of layers and regions may be exaggerated for clarity. When it is indicated that an element or layer is "on" or "above" another element or layer, this comprises a case in which another layer or element is interposed therebetween as well as a case in which the element or layer is directly above the other element or layer. In principle, like reference numerals designate like elements throughout the specification. In the following description, like reference numerals are used to designate elements which have the same function within the same idea illustrated in the drawings of each embodiment.

When detailed description of known functions or configurations related to the present disclosure is deemed to unnecessarily blur the gist of the disclosure, the detailed description thereof will be omitted. Also, numerals (e.g., first, second, etc.) used in the description herein are merely identifiers for distinguishing one element from another element.

In addition, the terms "module" and "unit" used to refer to elements in the following description are given or used in combination only in consideration of ease of writing the specification, and the terms themselves do not have distinct meanings or roles.

Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art. In addition, a suffix "region", "part", "unit" for a component used in the following description are given or mixed in consideration of only the ease of writing the specification, and do not have meanings or roles distinguished from each other.

The present disclosure relates to an actuator in particular for pivoting a rear view device (such as an external mirror for a vehicle) or a rear view element (such as a mirror element and/or a camera device), a rear view device and an external mirror comprising such an actuator.

Hereinafter, an actuator according to an embodiment of the present disclosure will be described in general.

Figure 2:
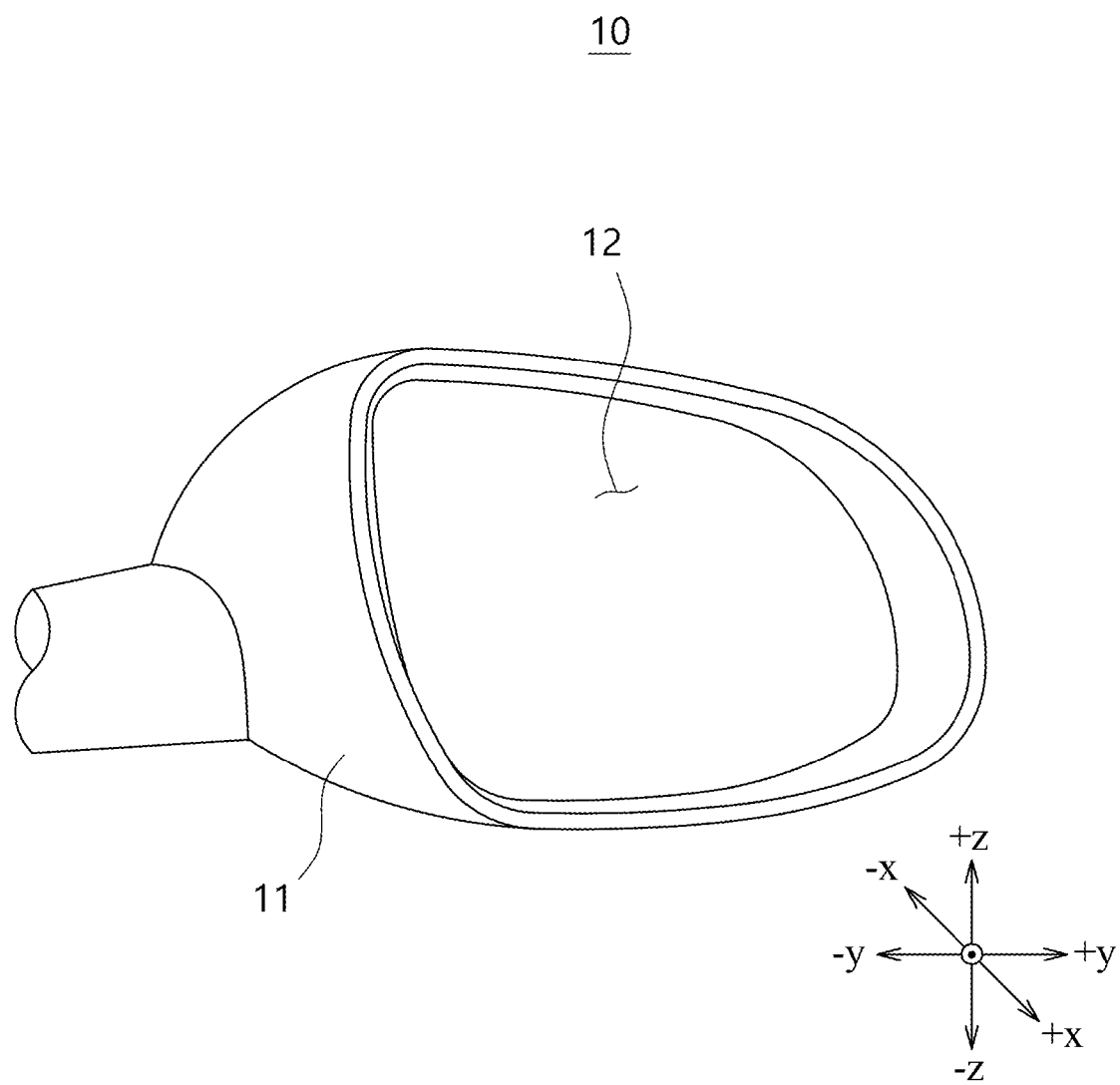
FIG. 2 illustrates an actuator according to an embodiment of the present disclosure.

FIG. 1 is an embodiment of a rear view device in form of an external mirror according to the present disclosure in which an actuator according to the present disclosure is mounted according to an embodiment of the present disclosure. FIG. 2 illustrates an actuator according to an embodiment of the present disclosure.

The following description will be made with reference to FIGS. 1 and 2.

The actuator 100 according to an embodiment of the present disclosure may be mounted on a rear view device 10 according to the present disclosure arranged outside the vehicle 1. Here, the rear view device is an external mirror 10 that may comprise a rear view element 12 providing a rear view to the driver. Further, the external mirror 10 may comprise a housing 11 accommodating the rear view element 12. For example, the rear view element 12 may be at least one mirror element. Alternatively, the rear view element 12 may be implemented as a display that outputs an image obtained by photographing a peripheral region of the vehicle 1 or a camera device or a combination of all these. However, for the convenience of description, embodiments in which the rear view element 12 is implemented as a mirror element will be mainly described below.

In the present disclosure, an external mirror 10 for a vehicle 1 will be described for convenience of description. However, the external mirror 10 in the present disclosure is not limited to vehicles 1, but may be applied to various transportation apparatus such as a two-wheel moving apparatus (for example, a motor bike).

According to various embodiments of the present disclosure, the actuator 100 may be mounted in the external mirror 10 for a vehicle 1 to perform an operation for pivoting the external mirror 10 and/or rear view element 12 for a vehicle 1. For example, the actuator 100 may be accommodated in the housing 11 of the external mirror 10 to provide power to pivot the rear view element 12 mounted on the external mirror 10.

The actuator 100 may operate to pivot the rear view element 12 in all directions with respect to a surface on which the rear view element 12 is arranged. For example, when the rear view element 12 is inclined parallel to the Z-Y axis in the initial state, the actuator 100 may rotate the rear view element 12 with respect to all of the y-axis, the x-axis, and the z-axis.

In the following description of the present disclosure, unless specifically mentioned, the −x-axis direction may refer to the traveling direction of the vehicle 1. For example, the x-axis direction may refer to the rear of the vehicle 1. In addition, the Y-axis direction may refer to a lateral direction of the vehicle 1. For example, the +y-axis direction may refer to a right direction of the vehicle 1, and the −y-axis direction may refer to a left direction of the vehicle 1. In addition, the Z-axis direction may refer to an upper or lower direction of the vehicle 1. For example, the −z-axis direction may refer to a lower direction of the vehicle 1, and the +z-axis direction may refer to an upper direction of the vehicle 1.

Figure 3:
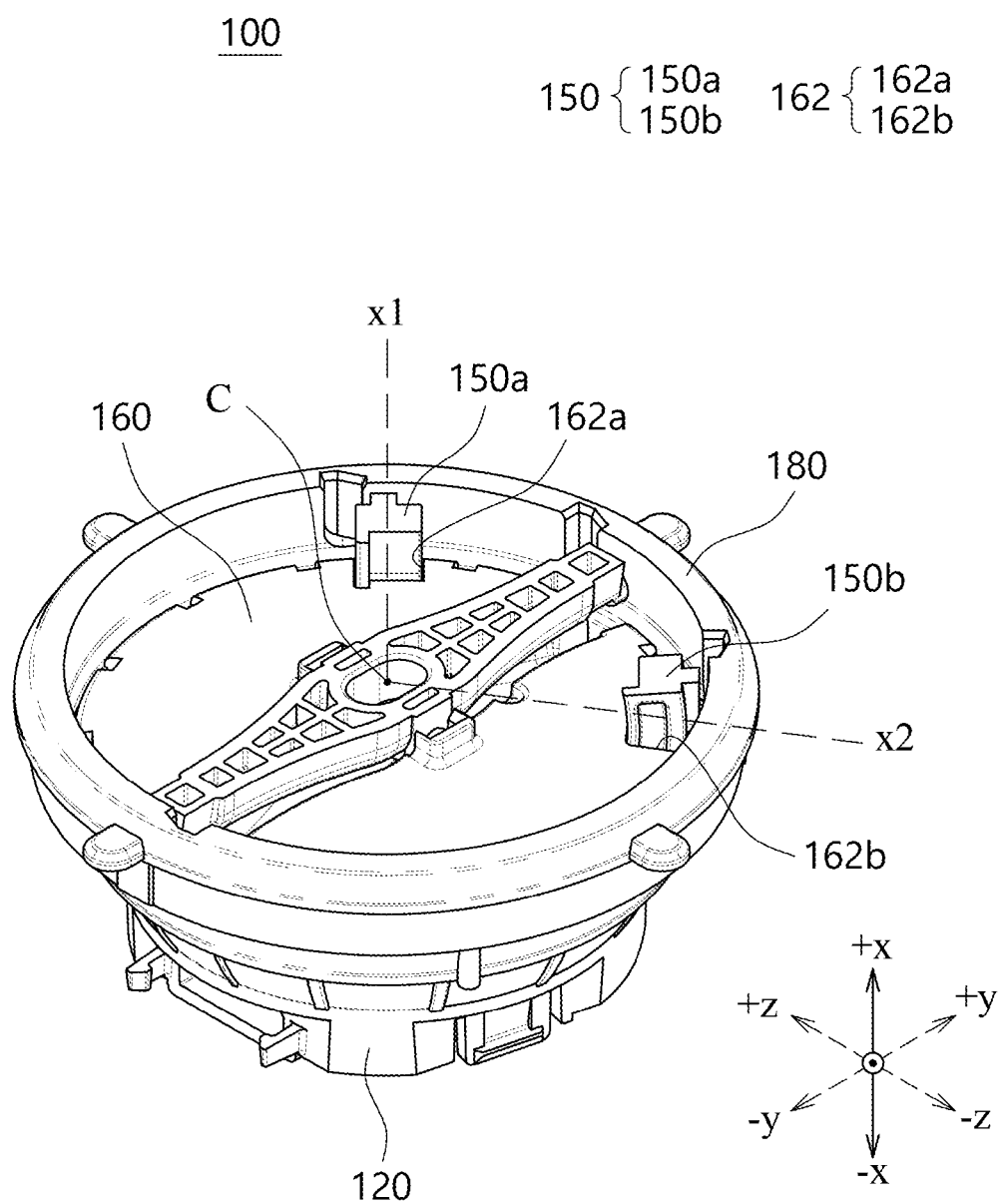
FIG. 3 is a perspective view of an actuator according to various embodiments of the present disclosure.
Figure 4:
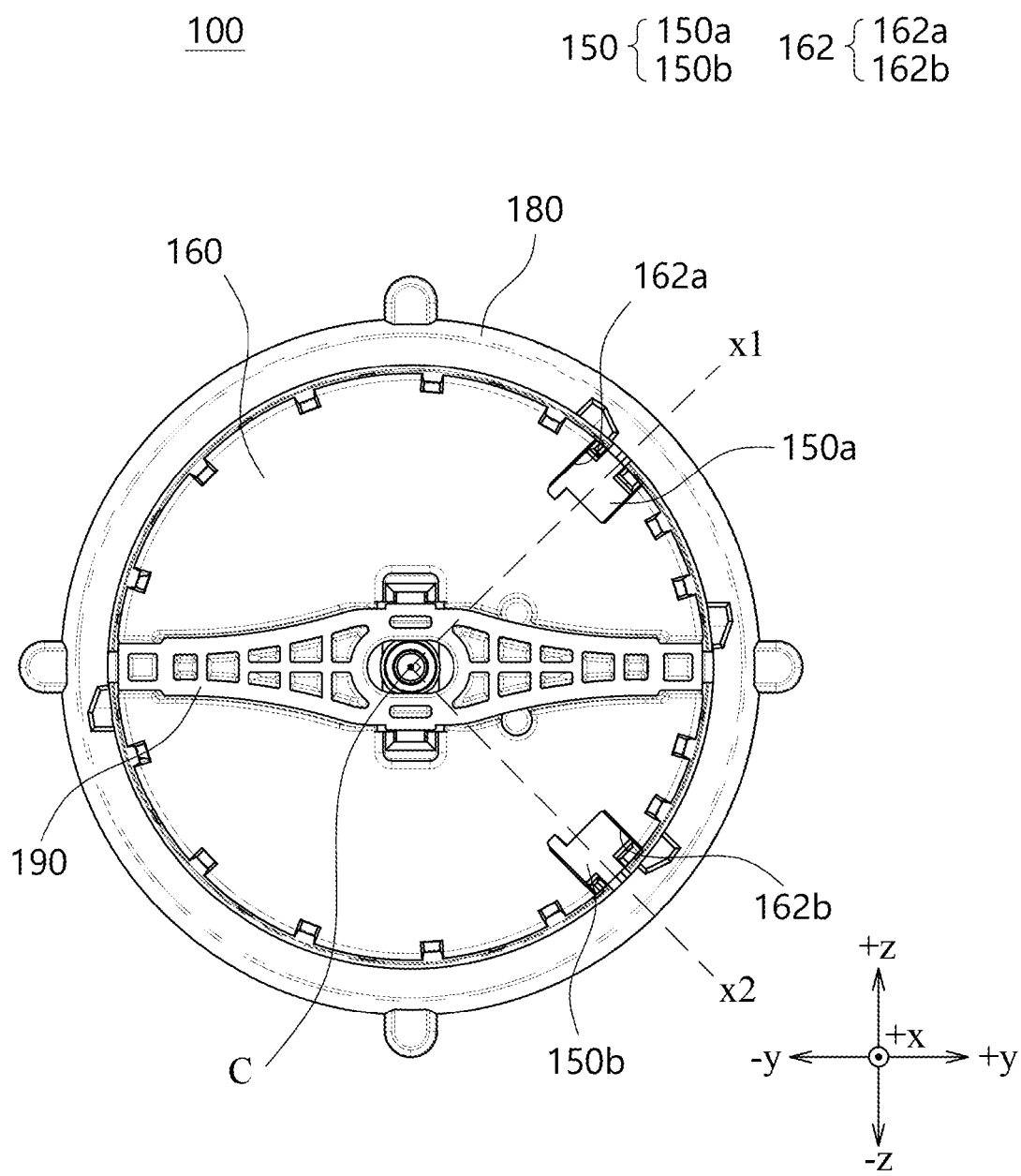
FIG. 4 is a top view of an actuator according to various embodiments of the present disclosure.
Figure 5:
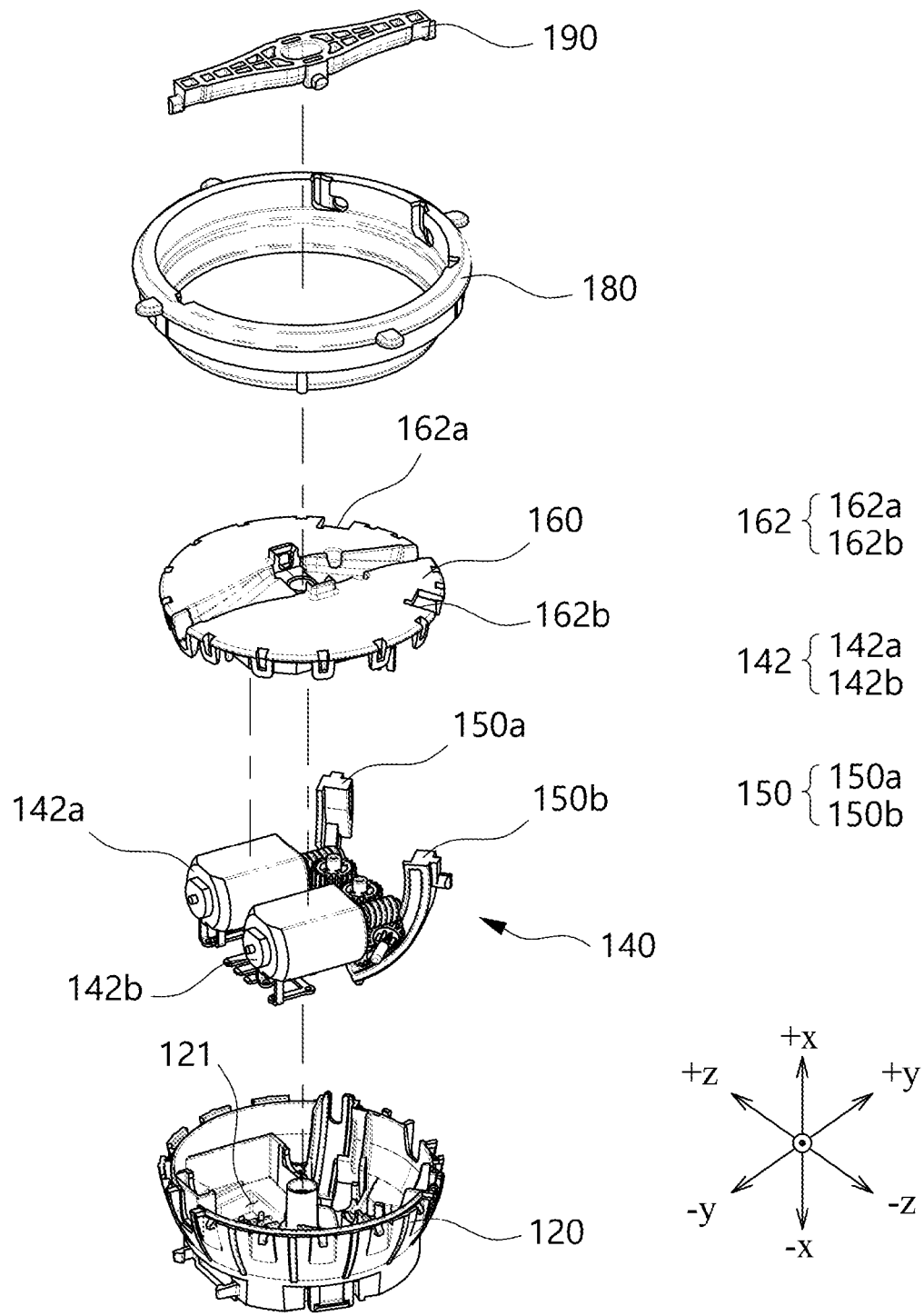
FIG. 5 is an exploded perspective view of an actuator according to various embodiments of the present disclosure.

FIG. 3 to FIG. 5 are views of an actuator 100 according to various embodiments of the present disclosure at various angles. FIG. 3 is a perspective view of an actuator 100 according to various embodiments of the present disclosure. FIG. 4 is a top view of an actuator 100 according to various embodiments of the present disclosure. FIG. 5 is an exploded perspective view of an actuator 100 according to various embodiments of the present disclosure.

Referring to FIGS. 3 to 5, the actuator 100 may comprise all or some of the lower case 120, the driving mechanism 140 accommodated in the lower case 120, the upper cover 160 shielding at least a part of the lower case 120, the holder 180 adapted to surround at least partially the lower case 120, and the connection element 190 connected to the holder 180 and configured to operate by receiving power from the driving mechanism 140. The actuator 100 of the embodiments of FIG. 3 to FIG. 5 may have a configuration that is the same as or similar to the actuator 100 of the embodiments of FIG. 1 and FIG. 2.

According to various embodiments of the present disclosure, the lower case 120 may provide a space in which the driving mechanism 140 may be accommodated. For example, the lower case 120 may have a bowl shape in which an accommodation space 121 is formed, and the driving mechanism 140 may be arranged in the accommodation space 121. In an embodiment according to the present disclosure, the lower case 120 may be formed such that a width of an upper side (+x-axis direction) is greater than a width of a lower side (−x-axis direction).

According to various embodiments of the present disclosure, the driving mechanism 140 may comprise a driving motor 142 and a drive gear 150. In an embodiment of the present disclosure, the driving motor 142 may comprise first and second driving motors 142a and 142b. However, it will be understood that the illustrated embodiments are exemplary, and fewer or more driving motors may be comprised. In an embodiment of the present disclosure, the driving motor 142 may be supplied with power from an external power source (e.g., an internal power source of the vehicle 1 of FIG. 1) to operate.

In one embodiment of the present disclosure, the driving mechanism 140 may comprise a drive gear 150 that operates to pivot the rear view element 12 (e.g., the rear view element 12 of FIG. 2). For example, the drive gear 150 may comprise a first drive gear 150a and a second drive gear 150b. The first drive gear 150a may operate by receiving power of the first driving motor 142a, and the second drive gear 150b may operate by receiving power of the second driving motor 142b. The first drive gear 150a and the second drive gear 150b are symmetrical to each other, and unless specifically mentioned, the description of the first drive gear 150a may be applied to the second drive gear 150b. Hereinafter, for convenience of description, the operation of the first drive gear 150a will be mainly described.

According to various embodiments of the present disclosure, the upper cover 160 may be arranged on the upper part of the lower case 120 and may shield the accommodation space 121. In an embodiment of the present disclosure, the upper cover 160 may comprise an opening region 162 for providing a moving path of the drive gear 150. For example, the opening region 162 may comprise a first opening region 162a through which the first drive gear 150a passes and a second opening region 162b through which the second drive gear 150b passes.

According to various embodiments of the present disclosure, the holder 180 may be adapted to surround at least partially the outer surface of the lower case 120. In an embodiment of the present disclosure, the holder 180 may have a ring shape. In an embodiment of the present disclosure, when the holder 180 is viewed from the side surface (e.g., the y-axis direction or the z-axis direction), the width of the lower side (−x-axis direction) may be formed to be smaller than the width of the upper side (+x-axis direction). For example, when viewed from a side surface (e.g., a y-axis direction or a z-axis direction), the holder 180 and the lower case 120 may have shapes corresponding to each other. In an embodiment of the present disclosure, a width (or diameter) of a part (e.g., an upper part (+x-axis direction)) of the holder 180 in the horizontal direction (y-axis or z-axis) may be greater than a width of the widest horizontal direction (y-axis or z-axis) of the lower case 120. In addition, a width of another part (e.g., a lower part (−x-axis direction)) of the holder 180 in the horizontal direction (y-axis or z-axis) may be smaller than a width of at least a part of the upper portion (+x-axis direction) of the lower case 120. Accordingly, after the holder 180 and the lower case 120 are assembled, the lower case 120 may be prevented from being separated in the lower vertical direction (−x axis direction) of the holder 180.

In an embodiment of the present disclosure, the holder 180 may be operably connected to the drive gear 150. For example, the holder 180 may be connected to each of the first drive gear 150a and the second drive gear 150b, and may be pivoted with respect to the horizontal plane (e.g., the y-z plane, for example, the surface of the rear view element 12) in correspondence to the operation of the first drive gear 150a and the second drive gear 150b. As the first drive gear 150a and the second drive gear 150b are arranged at right angles to each other, the holder 180 may be pivoted in all directions with respect to the horizontal plane (y-z plane). In an embodiment of the present disclosure, the holder 180 may be connected to the rear view element 12 (e.g., the rear view element of FIG. 2), and the rear view element may be pivoted corresponding to the operation of the holder 180.

In an embodiment of the present disclosure, the connection element 190 may be operably connected between the upper cover 160 and the holder 180. For example, a central portion of the connection element 190 may be rotatably connected to a central region of the upper cover 160, and both edges of the connection element 190 may be connected to the holder 180. As a portion of the connection element 190 (for example, a central region connected to the upper cover 160) is supported by the upper cover 160, the holder 180 may be stably pivoted.

In an embodiment of the present disclosure, the first drive gear 150a and the second drive gear 150b may be adapted to form a designated angle with respect to a horizontal surface (e.g., a z-y plane) of an upper region of the holder 180. Since the rear view element 12 (e.g., the rear view element 12 of FIG. 2) is arranged above the holder 180, the z-y plane may refer to a surface parallel to the surface of the rear view element 12. For example, the designated angle may be approximately a right angle. As another example according to an embodiment of the present disclosure, an angle formed by the axis x1 extending from the center point C of the width direction plane (z-y plane) of the actuator 100 to one end of the first drive gear 150a and the axis x2 extending from the center point c to one end of the first drive gear 150a of the second drive gear 150b may be represented as a right angle. As will be described later, the first drive gear 150a may rotate about a direction parallel to the x2 axis, and the second drive gear 150b may rotate about a direction parallel to the x1 axis. For example, the x1 axis may be the same axis as the y axis, and the x2 axis may be the same axis as the z axis. As another example according to an embodiment of the present disclosure, the x1 axis may be the same axis as the z axis, and the x2 axis may be the same axis as the y axis.

Figure 6:
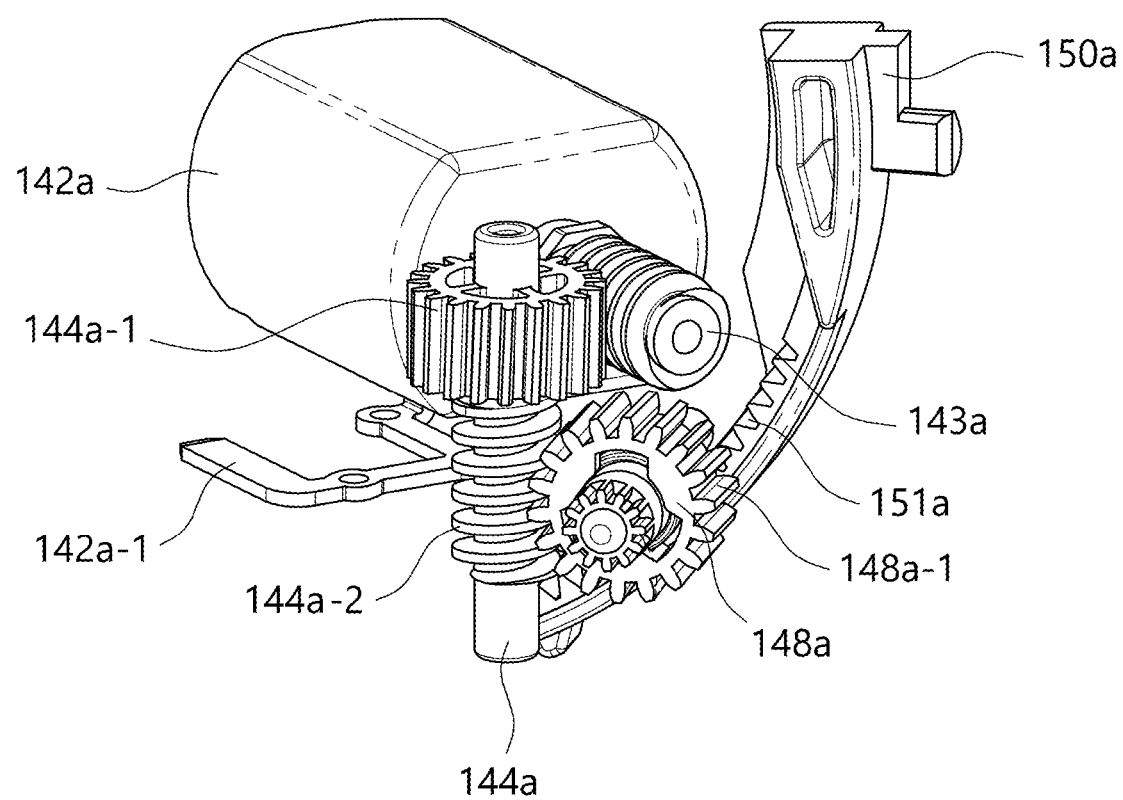
FIG. 6 is a view illustrating a driving mechanism on a first side according to various embodiments of the present disclosure.
Figure 7:
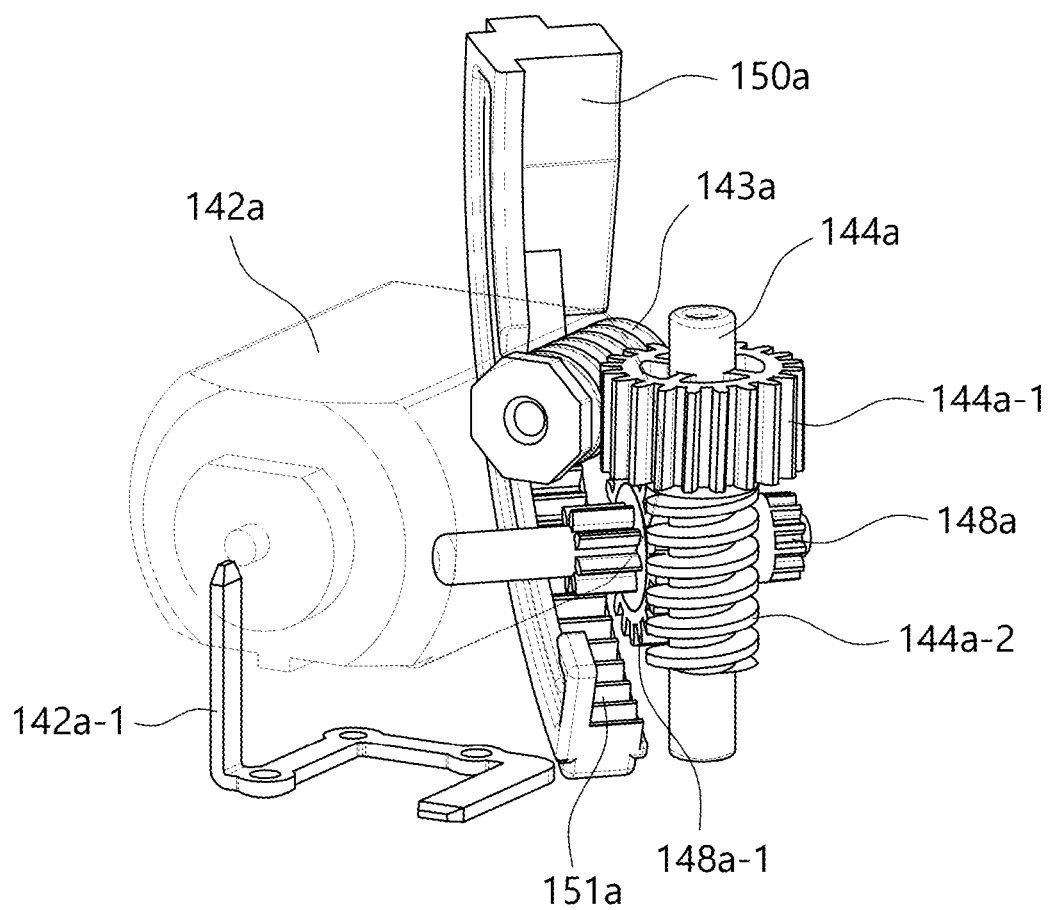
FIG. 7 is a view illustrating a driving mechanism on a second side according to various embodiments of the present disclosure.
Figure 8:
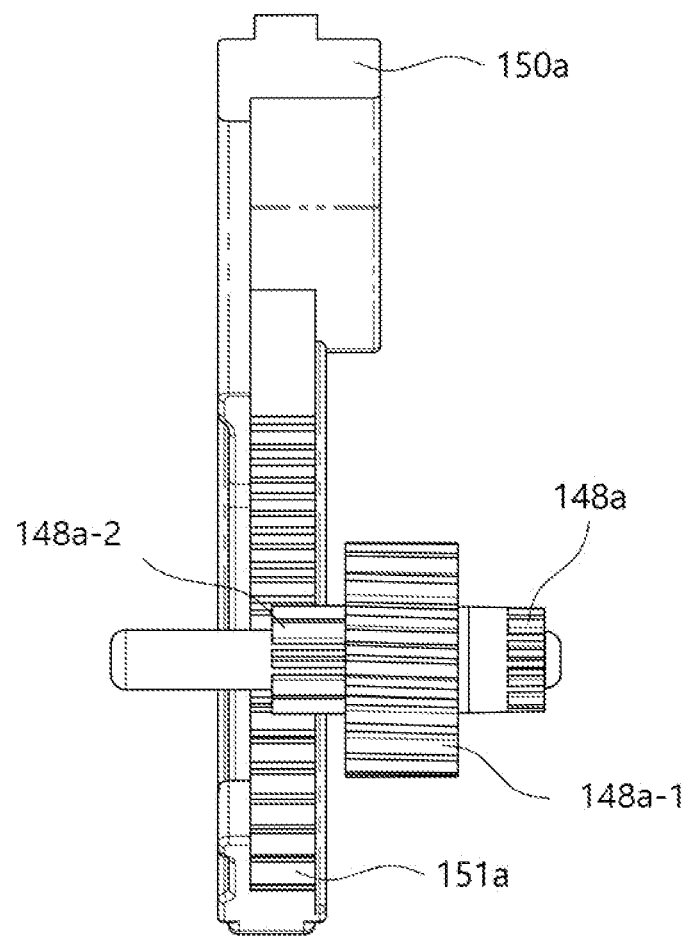
FIG. 8 is a view illustrating a drive gear and a clutch gear according to various embodiments of the present disclosure.

FIG. 6 to FIG. 8 illustrate an embodiment according to the present disclosure of a driving mechanism 140 according to various embodiments of the present disclosure. FIG. 6 is a view illustrating a driving mechanism 140 according to various embodiments of the present disclosure on a first side. FIG. 7 is a view illustrating a driving mechanism 140 according to various embodiments of the present disclosure on a second side. FIG. 8 is a view illustrating a drive gear 150 and a clutch gear 148 according to various embodiments of the present disclosure.

Referring to the embodiments of FIGS. 6 to 8, the driving mechanism 140 may comprise at least some of a first driving motor 142a, a first transmission gear 144a, a first clutch gear 148a, and a first drive gear 150a. Stated differently, the driving mechanism 140 may be said to comprise a first driving mechanism 140a (a driving mechanism associated with the first driving motor 142a) and a second driving mechanism 140b (e.g., a driving mechanism associated with the second driving motor 142b). The description of the driving mechanism 140 (e.g., the driving mechanism 140 of FIG. 5) in the above-described embodiments of the present disclosure may be applied to the driving mechanism 140 of FIGS. 6 to 8.

According to various embodiments of the present disclosure, the first driving motor 142a may comprise a first terminal 142a-1 and a first output gear 143a. The first terminal 142a-1 may be electrically connected to the outside of the first driving motor 142a (e.g., internal power of the vehicle) to receive power for operating the first driving motor 142a. In an embodiment of the present disclosure, the first terminal 142a-1 may be connected to another terminal or a circuit board arranged in the lower case 120 (e.g., the lower case 120 of FIG. 5), or may be connected to another terminal outside the lower case 120. The first output gear 143a may transmit the power of the first driving motor 142a to other components.

According to various embodiments of the present disclosure, the first transmission gear 144a may be connected to the first output gear 143a. In addition, the first transmission gear 144a may be connected to the first clutch gear 148a. In other words, the first transmission gear 144a may connect the first output gear 143a and the first clutch gear 148a. In an embodiment of the present disclosure, the first transmission gear 144a may comprise a first transmission part 144a-1 for connecting with the first output gear 143a and a second transmission part 144a-2 for connecting with the first clutch gear 148a. In an embodiment of the present disclosure, the first transmission part 144*a*-1 and the second transmission part 144*a*-2 may transmit power in different directions, or may transmit power in the same direction. For example, the first transmission part 144*a*-1 may be provided as a spur gear or a helical gear, and the second transmission part 144*a*-2 may be provided as a worm gear.

According to various embodiments of the present disclosure, the first clutch gear 148*a* may comprise a first part 148*a*-1 for receiving power from the first transmission gear 144*a* and a second part 148*a*-2 for engaging with at least a portion of the first drive gear 150*a*. In one embodiment of the present disclosure, the first part 148*a*-1 may be provided as a spur gear or a helical gear to engage the second part 148*a*-2. In addition, the second part 148*a*-2 may be provided as a pinion gear to engage the first drive gear 150*a*. In an embodiment of the present disclosure, the first part 148*a*-1 and the second part 148*a*-2 may share the same axis but have different diameters. For example, the second part 148*a*-2 provided as a pinion gear may have a diameter which is smaller than that of the first part 148*a*-1.

According to various embodiments of the present disclosure, the first drive gear 150*a* may comprise a first driving region 151*a* to be engaged with the second part 148*a*-2. In an embodiment of the present disclosure, the first driving region 151*a* may be provided as a rack gear. In addition, the first drive gear 150*a* may have a smoothly curved shape. For example, the first drive gear 150*a* may be arc-shaped. Since the first drive gear 150*a* has an arc shape, the first drive gear 150*a* may smoothly perform a revolve motion based on the central axis of the arc (e.g., the x2 axis of FIG. 4) in correspondence with the operation of the second part 148*a*-2. In addition, the first drive gear 150*a* may move along an inner surface of the lower case 120, as described below. To this end, the shape of the outer surface of the first drive gear 150*a* and the shape of the inner surface of the lower case 120 may correspond to each other. For example, the curvature of the outer surface of the first drive gear 150*a* may be substantially the same as the curvature of the inner surface of the lower case 120.

In the above description and the following description of the present disclosure, the first drive gear 150*a* and various components for driving the first drive gear 150*a* (e.g., the first driving motor 142*a*, the first transmission gear 144*a*, and the first clutch gear 148*a*) will be mainly described. As described above, the description of this can be equally (or symmetrically) applied to the second drive gear 150*b* and the components for driving the second drive gear 150*b*. That is, it will be understood that the driving mechanism 140 may comprise all or some of a second drive gear 150*b* (e.g., the second drive gear 150*b* of FIG. 4) and components for driving the same (e.g., the second driving motor 142*b*, the second transmission gear 144*b*, and the second clutch gear 148*b*), similar to the first drive gear 150*a*.

In various embodiments, since the first drive gear 150*a* moves in comparison to other components constituting the driving mechanism 140 engaged with each other to rotate, it is necessary to stably support the first drive gear 150*a* or limit the range of movement of the first drive gear 150*a* during operation of the first drive gear 150*a*.

Figure 9:
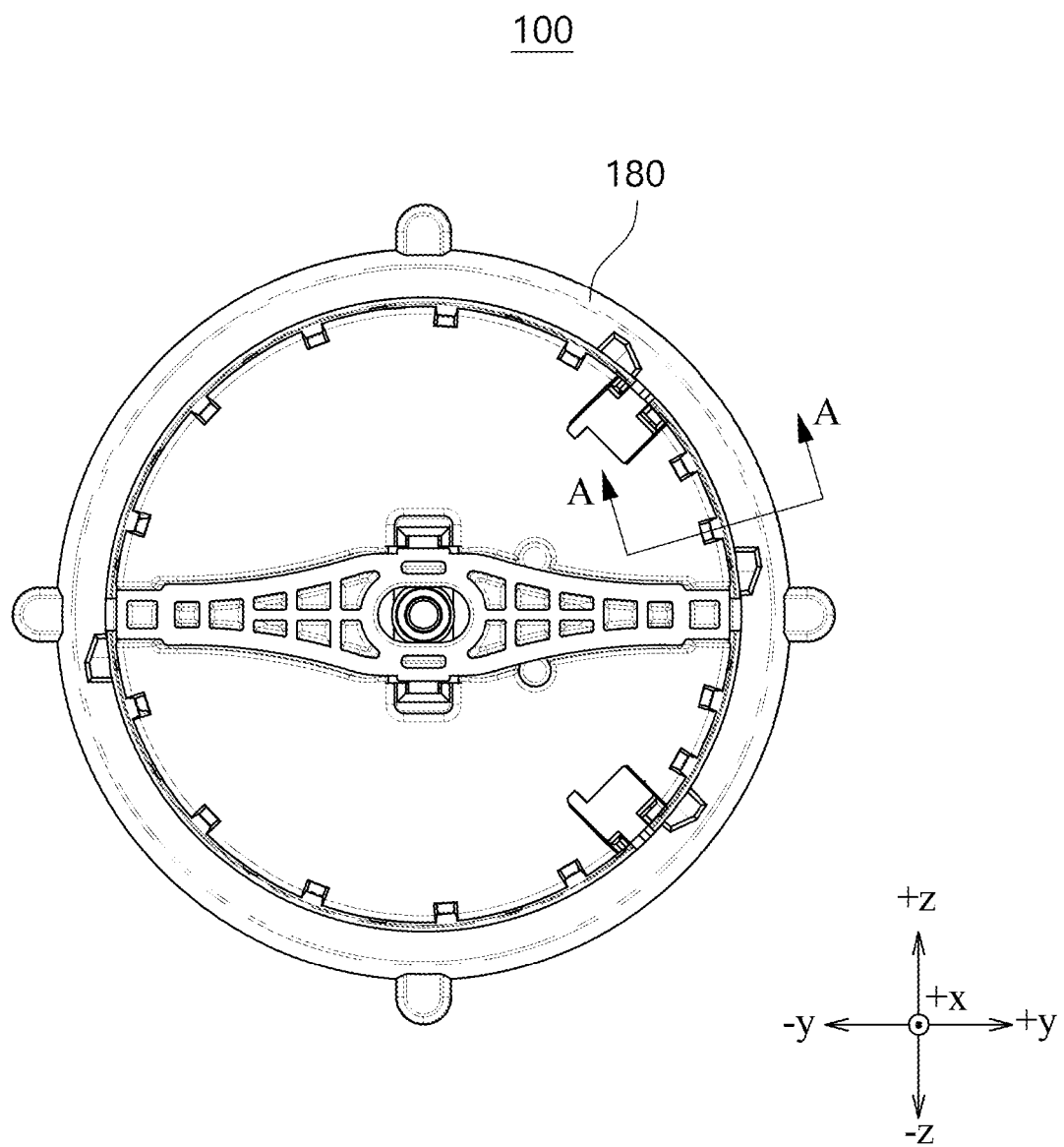
FIG. 9 illustrates an actuator according to various embodiments of the present disclosure viewed from above.
Figure 10:
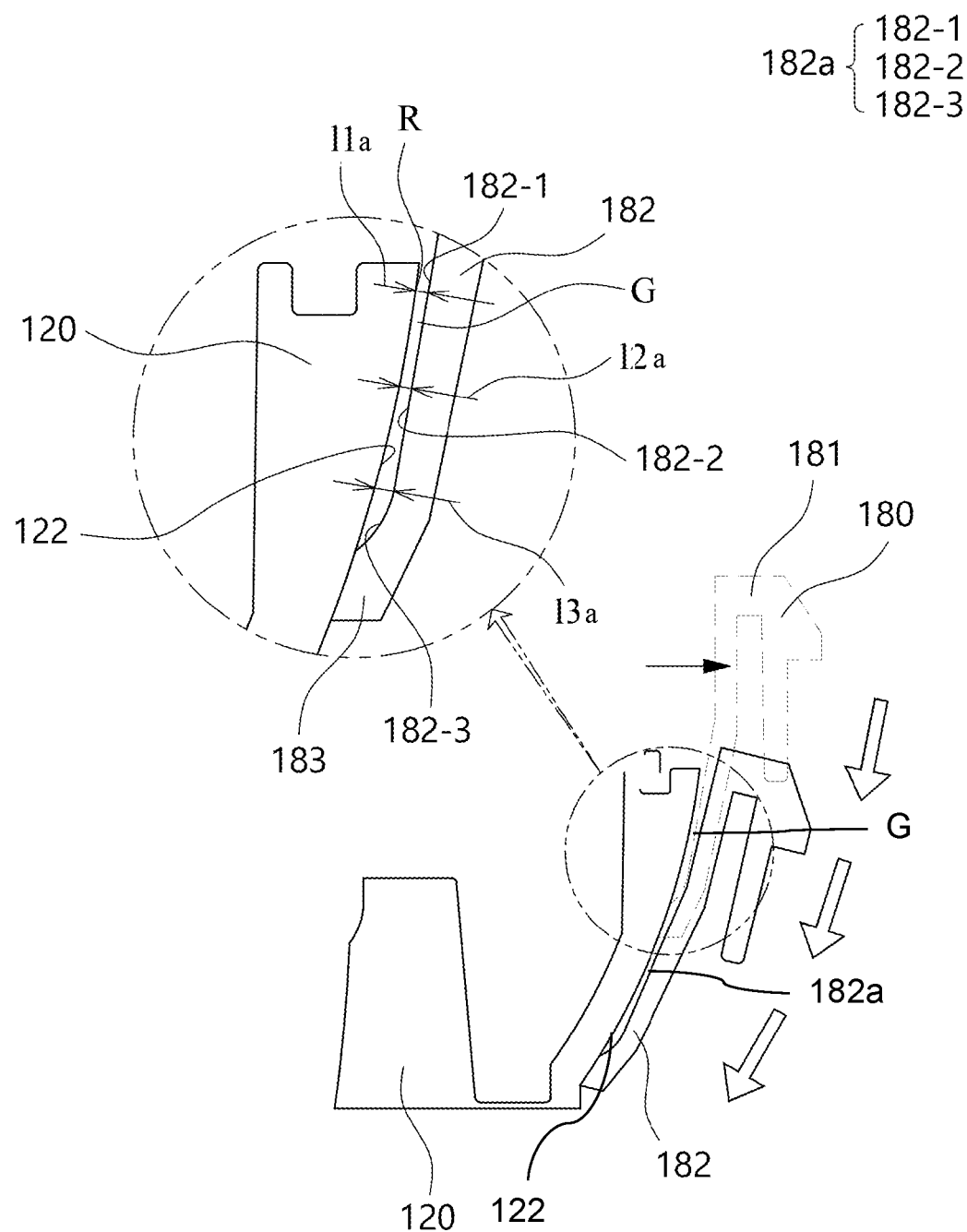
FIG. 10 is a view illustrating a cross section taken along line A-A' of FIG. 9.

FIG. 9 and FIG. 10 are views illustrating an embodiment of a holder according to the present disclosure. FIG. 9 illustrates an actuator according to various embodiments of the present disclosure viewed from above. FIG. 10 is a view illustrating a cross section taken along line A-A' of FIG. 9.

Referring to FIGS. 9 and 10, the holder 180 may be adapted to surround the lower case 120 while being in contact with at least a part of the outer surface 122 of the lower case 120. The description of the holder 180 and the lower case 120 described with reference to FIG. 5 may be applied to the description of the holder 180 and the lower case 120 of FIGS. 9 and 10.

According to various embodiments of the present disclosure, the holder 180 may comprise a ring-shaped supporting part 181, an extension part 182 extending from the supporting part, and a protrusion 183 formed at an edge of the extension part 182. In an embodiment of the present disclosure, the inner surface 182*a* of the extension part 182 may be adapted to be spaced apart from the outer surface 122 of the lower case 120, and the protrusion 183 may be adapted to be in contact with at least a part of the outer surface 122 of the lower case 120. For example, in the holder 180 having a substantially ring shape, when viewed in the −x-axis direction, the diameter of the circle formed by the supporting part 181 may be greater than the maximum diameter of the circle formed by the outer surface 122 of the lower case 120. In addition, when viewed in the −x-axis direction, the diameter of the circle formed by the protrusion part 183 may be smaller than the diameter of the circle formed by the outer surface 122 of the lower case 120. In an embodiment of the present disclosure, the holder 180 may be formed of an elastic material. The protrusion, in form of a contact part 183, may increase a coupling force between the holder 180 and the lower case 120 by an elastic force, and may be stably slid from the outer surface 122 when the holder 180 moves along the outer surface 122 of the lower case 120 according to driving of the actuator 100. Since the protrusion 183 in form of a contact part 183 contacts the outer surface 122, it may be referred to as a contact part 183. In one embodiment of the present disclosure, the contact part 183 may be formed to be smooth in surface so as to be easily slid from the outer surface 122, or the region in contact with the outer surface 122 may have a rounded shape.

According to various embodiments of the present disclosure, a gap G may be formed between the inner surface 182*a* of the extension part 182 of the holder 180 and the outer surface 122 of the lower case 120. When the holder 180 moves along the lower case 120 in a state in which the larger regions are in contact with each other, noise may be generated or durability of the holder 180 may be weakened. Therefore, the gap G between the extension part 182 and the lower case 120 may be formed, thereby enhancing the durability of the holder 180 and reducing noise that may be generated when the actuator 100 is driven.

According to various embodiments of the present disclosure, the inner surface 182*a* of the extension part 182 may have a non-uniform shape. In an embodiment, the inner surface 182*a* may comprise a first inner surface 182-1, a second inner surface 182-2, and a third inner surface 182-3. When the outer surface 122 of the lower case 120 has a predetermined shape (a smooth curved surface), distances between the first inner surface 182-1, the second inner surface 182-2, and the third inner surface 182-3 and the outer surface 122 may be different from each other. For example, a first distance 11*a* between the first inner surface 182-1 and the outer surface 122, a second distance 12*a* between the second inner surface 182-2 and the outer surface 122, and a third distance 13*a* between the third inner surface 181-3 and the outer surface 122 may be different from each other. A plurality of inflection points may exist between the first inner surface 182-1, the second inner surface 182-2, and the third inner surface 182-3. The inclination of the inner surface 182*a* may be changed based on the plurality of inflection points, and the inner surface 182*a* may have a non-uniform shape.

In one embodiment of the present disclosure, the curvature of the extension part 182 may be formed to correspond to (substantially equal to) the curvature of the outer surface 122 of the lower case 120. In this case, even though the holder 180 is moved according to the driving of the actuator 100, the presence of the gap G may be maintained, but the distance between the holder 180 and the lower case 120 at a specific point of the lower case 120 may be changed.

For example, as illustrated in FIG. 10, in an initial state of the actuator 100, a distance from a reference point R of the outer surface 122 to the inner surface 182 (specifically, in the initial state of the actuator 100, the first inner surface 182-1) may be a first distance 11a. When the holder 180 is moved according to the driving of the actuator 100 (rotated in the +x axis direction), the second inner surface 182-2 may be located at a position corresponding to the reference point R, and the distance from the reference point R to the inner surface 182a may be changed to the second distance 12a. Similarly, when the holder 180 is further moved, the distance from the reference point R to the inner surface 182a may be changed to a third distance 13a, and as a result, the reference point R and the protrusion 183 may contact each other.

Although not shown, in some embodiments of the present disclosure, the inner surface 182a may be formed in a smooth curve, and the outer surface 122 may have a non-uniform shape. In addition according to another embodiment of the present disclosure, both the inner surface 182 and the outer surface 122 may have a non-uniform shape.

As described above, although the embodiments are described by the limited embodiments and the drawings, various modifications and changes may be made by those skilled in the art from the above description. For example, appropriate results may be achieved even if the described techniques are performed in a different order than the described method, and/or components of the described system, structure, apparatus, circuit, etc. are combined or combined in a different form than the described method, or replaced or substituted by other components or equivalents.

Therefore, other implementations, other embodiments, and those equivalent to the claims also fall within the claims to be described below.

REFERENCE SIGNS 1 vehicle
10 external mirror
11 housing
11a first distance
12 rear view element
12a second distance
13a third distance
100 actuator
120 lower case
121 accommodation space
122 outer surface
140 driving mechanism
142 driving motor
142a, 142b first, second driving motor
142a1 first terminal
143 output gear
143a, 143b first, second output gear
144 transmission gear
144a, 144b first, second transmission gear
144a-1, 144a-2 first, second transmission part
148 clutch gear
148a, 148b first, second clutch gear
148a-1, 148a-2 first, second part
148a-3 auxiliary gear
150 drive gear
150a, 150b first, second drive gear
151a, 151b first, second driving region
160 upper cover
162 opening region
162a, 162b first, second opening region
180 holder
181 supporting part
182 extension part
182-1, 182-2 first, second inner surface
182-3 third inner surface
182a inner surface
183 contact part
190 connection element
C center point
G gap
R reference point

The invention claimed is:

1. An actuator for pivoting a rear view device for a vehicle or at least one rear view element of the rear view device, comprising:
a lower case;
a driving mechanism that includes at least a first drive gear;
an upper cover; and
a holder that includes a supporting part for the at least one rear view element and an extension part extended from the supporting part,
wherein a gap is formed between an inner surface of the extension part of the holder and an outer surface of the lower case,
wherein the extension part comprises a first inner surface and a second inner surface facing toward the lower case,
wherein a first shortest distance between the first inner surface and the outer surface of the lower case differs from a second shortest distance between the second inner surface and the outer surface of the lower case,
wherein the extension part further comprises a third inner surface, wherein a shortest distance between the third inner surface and the outer surface of the lower case is different from at least one of the first shortest distance or the second shortest distance,
wherein during movement of the holder the presence of the gap is maintained, and wherein the distance between the holder and the lower case at a specific point of the lower case is changed,
wherein at least one surface-section or an entire inner surface of the extension part has a non-uniform shape such that a shortest distance from a fixed point of the outer surface of the lower case to at least one surface-section or the entire inner surface of the extension part changes according to an operation of the first drive gear, and
wherein the upper cover includes an opening region through which the first drive gear passes.

2. The actuator of claim 1, wherein the lower case has an accommodation space formed inside and has a bowl shape.

3. The actuator of claim 2, wherein the driving mechanism is arranged in the accommodation space.

4. The actuator of claim 1, wherein the driving mechanism further includes one or more of a driving motor, a first transmission gear, or a first clutch gear.

5. The actuator of claim 4, wherein the driving mechanism is configured to rotationally move along a part of the lower case by receiving power from the driving motor.

6. The actuator of claim 3, wherein the upper cover is arranged on the lower case and/or shields at least a part of the accommodation space.

7. The actuator of claim 1, wherein the holder is moved according to driving of the actuator.

8. The actuator of claim 1, wherein the holder is configured to surround the outer surface of the lower case while being in contact with at least a part of the outer surface of the lower case.

9. The actuator of claim 4, wherein the holder is connected to the first drive gear such that at least a part thereof operates along the outer surface of the lower case.

10. The actuator of claim 1, wherein the holder is made of an elastic material.

11. The actuator of claim 1, wherein the holder comprises a contact part.

12. The actuator of claim 1, wherein the actuator comprises a connection element arranged between the upper cover and the holder.

13. The actuator of claim 1, wherein the supporting part has a ring shape.

14. The actuator of claim 4, wherein the first transmission gear is connected with a first output gear and/or the first clutch gear.

15. The actuator of claim 14, wherein the first transmission gear comprises,
   a first transmission part for connecting with the first output gear, and
   a second transmission part for connecting with the first clutch gear.

16. The actuator of claim 14, wherein the first clutch gear comprises,
   a first part for receiving power from the first transmission gear, and
   a second part for engaging with at least a portion of the first drive gear.

17. The actuator of claim 11, wherein the contact part is formed to be protruding at an edge of the extension part, and/or is configured to be in contact with the outer surface of the lower case.

18. The actuator of claim 15, wherein the first transmission part and the second transmission part transmit power in different directions or transmit power in the same direction.

19. The actuator of claim 18, wherein the first transmission part is provided as a spur gear or a helical gear.

20. The actuator of claim 18, wherein the second transmission part is provided as a worm gear.

21. The actuator of claim 16, wherein the first part is provided in form of a spur gear or a helical gear to engage the second part.

22. The actuator of claim 16, wherein the second part is provided as a pinion gear to engage the first drive gear.

23. The actuator of claim 11, wherein a diameter of a circle formed by the contact part is smaller than a minimum diameter of a circle formed by the outer surface of the lower case.

24. The actuator of claim 16, wherein the first drive gear comprises a first driving region to be engaged with the second part.

25. The actuator of claim 24, wherein the first driving region is provided as a rack gear.

26. The actuator of claim 1, wherein the outer surface of the lower case has a predetermined curvature which is constant and/or equal to a curvature of the extension part.

27. The actuator of claim 1, wherein the inner surface of the extension part comprises at least two inflection points between the first inner surface, the second inner surface, and the third inner surface, wherein an inclination of the inner surface is changed based on the plurality of inflection points.

28. The actuator of claim 4, wherein the driving motor comprises a first terminal and a first output gear.

29. The actuator of claim 28, wherein the first terminal is electrically connected to an outside of the driving motor to receive power for operating the driving motor.

30. The actuator of claim 28, wherein the first terminal is connected to another terminal or a circuit board arranged in the lower case.

31. The actuator of claim 28, wherein the first terminal is connected to another terminal outside the lower case.

32. The actuator of claim 28, wherein the first output gear transmits power of the driving motor to other components of the rear view device and/or vehicle.

33. The actuator of claim 11, wherein the contact part is configured to slide in a state of being in contact with the outer surface of the lower case according to an operation of the driving mechanism.

34. The actuator of claim 12, wherein a central portion of the connection element is rotatably connected to a central region of the upper cover, wherein both edges of the connection element are connected to the holder.

35. The actuator of claim 11, wherein at least one region of the contact part to be in contact with the lower case has a round shape.

36. The actuator of claim 4, wherein the driving mechanism further comprises a second driving motor and/or a second drive gear.

37. The actuator of claim 36, wherein the holder is connected to each of the first drive gear and the second drive gear and is pivoted with respect to a horizontal plane in correspondence to operation of the first drive gear and the second drive gear.

38. The actuator of claim 36, wherein the lower case has an accommodation space formed inside and wherein the second driving motor is arranged in the accommodation space.

39. The actuator of claim 36, wherein the second drive gear is operated by receiving power from the second driving motor, and wherein the second drive gear is arranged in a direction perpendicular to the first drive gear.

40. The actuator of claim 36, wherein the first drive gear and the second drive gear are configured to form a designated angle with respect to a horizontal surface of an upper region of the holder.

41. The actuator of claim 40, wherein the designated angle is a right angle or substantially a right angle.

42. The actuator of claim 36, wherein the second drive gear is pivotable in all directions with respect to a plane formed by an upper surface of the lower case.

43. The actuator of claim 1, wherein the outer surface of the first drive gear and the inner surface of the lower case have corresponding shapes.

44. The actuator of claim 1, wherein the first drive gear has a smoothly curved shape.

45. The actuator of claim 44, wherein the smoothly curved shape is arc-shaped.

46. The actuator of claim 1, wherein the inner surface is formed in a smooth curve.

47. The actuator of claim 1, wherein the outer surface has a non-uniform shape.

48. A rear view device for a vehicle comprising at least one actuator according to claim 16.

49. The rear view device of claim 48, wherein the rear view device is provided in form of an external mirror.

50. The rear view device of claim 49, wherein the rear view device comprises,
a housing accommodating the at least one actuator, and
the at least one rear view element comprising at least one mirror, display unit, or camera device.

51. The rear view device of claim 50, wherein the at least one rear view element is configured to connect with the holder to pivot.

52. A vehicle with at least one rear view device of claim 48.

* * * * *